US006963340B1

(12) United States Patent
Alben et al.

(10) Patent No.: US 6,963,340 B1
(45) Date of Patent: Nov. 8, 2005

(54) GRAPHICS PROCESSOR AND SYSTEM WITH MICROCONTROLLER FOR PROGRAMMABLE SEQUENCING OF POWER UP OR POWER DOWN OPERATIONS

(75) Inventors: Jonah M. Alben, San Jose, CA (US); Dennis K D Ma, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 82 days.

(21) Appl. No.: 10/233,650

(22) Filed: Sep. 3, 2002

(51) Int. Cl.[7] .................................................. G06T 1/00
(52) U.S. Cl. ........................ 345/501; 345/520; 713/330
(58) Field of Search ................ 345/211–214, 501–506, 345/519, 520, 534; 713/320, 324, 330

(56) References Cited

U.S. PATENT DOCUMENTS

| | | | | |
|---|---|---|---|---|
| 4,819,173 A * | 4/1989 | Brauninger | ................. | 701/110 |
| 5,138,305 A * | 8/1992 | Tomiyasu | ................. | 345/3.1 |
| 5,278,404 A * | 1/1994 | Yeates | ................. | 250/214 C |
| 5,790,096 A | 8/1998 | Hill, Jr. | ................. | 345/150 |
| 5,907,713 A * | 5/1999 | Chen et al. | ................. | 713/320 |
| 5,991,883 A * | 11/1999 | Atkinson | ................. | 713/300 |
| 6,138,209 A * | 10/2000 | Krolak et al. | ................. | 711/128 |
| 6,243,817 B1 * | 6/2001 | Melo et al. | ................. | 713/300 |

* cited by examiner

*Primary Examiner*—Kee M. Tung
*Assistant Examiner*—G. F. Cunningham
(74) *Attorney, Agent, or Firm*—Moser Patterson & Sheridan LLP

(57) ABSTRACT

A graphics processor or display device including a microcontroller that functions as a sequencer, a computer system including at least one such graphics processor or display device, and a microcontroller for use in such a graphics processor or display device. In preferred embodiments, the microcontroller functions as a sequencer for controlling the timing of power up and/or power down operations by one or both of a graphics processor and a display device. The microcontroller is implemented to exclude any capacity to handle interrupts and so can provide guaranteed timing, and is preferably implemented to be small, simple, and programmable, and to store a small number of programs. Each program consists of instructions belonging to a small instruction set, such as a set consisting of set and clear instructions (for overriding or overwriting specified register bits) and wait, release, and stop instructions. When executing a program, the microcontroller typically overrides (in an ordered sequence) state and control bits that would otherwise be asserted.

37 Claims, 2 Drawing Sheets

GRAPHICS PROCESSOR AND SYSTEM WITH MICROCONTROLLER FOR PROGRAMMABLE SEQUENCING OF POWER UP OR POWER DOWN OPERATIONS

TECHNICAL FIELD OF THE INVENTION

The invention pertains to computer systems in which a graphics processor or display device includes a microcontroller that can be programmed to control the timing of operations (such as power up or power down operations) by one or both of the graphics processor and display device.

BACKGROUND OF THE INVENTION

The invention is useful in computer systems, for example the computer system of FIG. 1. The FIG. 1 system includes system bus 1, central processing unit (CPU) 2, pipelined graphics processor (GPU) 4, input device 3, memory 5, frame buffer 6, and display device 8, connected as shown. Display device 8 is typically a liquid crystal (or other flat panel) display or cathode ray tube monitor. GPU 4 is coupled to system bus 1 via host slave interface 10. In response to input data received over the system bus, pipelined processing circuitry 12 in GPU 4 generates video data for display by device 8. Circuitry 12 can include a vertex processor (for generating vertex data indicative of the coordinates of the vertices of each primitive of each image to be rendered and attributes of each vertex), a rasterizer (for generating pixel data in response to the vertex data), and pixel processing circuitry for applying textures to and otherwise processing the pixel data from the rasterizer. The video data output from circuitry 12 are asserted to frame buffer 6. Consecutive frames of the video data are asserted by frame buffer 6 to display device 8.

Control circuitry 15 controls operation of pipelined processing circuitry 17 and other elements of GPU 4, including by setting bits in register 29 which are then asserted to circuitry 17 and/or other elements of GPU 4 via multiplexer 30 (to be described below).

GPU 4 is typically implemented as an integrated circuit (chip), a graphics processing portion of a chip (sometimes referred to as a graphics "core" or "core portion"), or two or more chips. Typically, both GPU 4 and frame buffer 6 are implemented as separate chips of a graphics card. Alternatively, both frame buffer 6 and graphics processor 4 are implemented as elements of a single chip.

As shown, GPU 4 includes microcontroller 14 which is implemented in accordance with the invention to control the timing of power up (and power down) operations by GPU 4 and display device 8. Microcontroller 14 includes program memory 16 (typically implemented as a RAM to be referred to herein as a "sequencer RAM"), instruction execution circuitry 20 (sometimes referred to below as "unit" 20), bypass register 28, multiplexer 30, and other elements to be described below.

Variations on GPU 4 that have conventional design (and do not embody the invention) do not include microcontroller 14 and instead employ conventional hardware and/or software to control the timing and sequencing of power up and power down operations of GPU 4 and optionally also display device 8.

For example, such conventional hardware and software can be an implementation of control circuitry 15 that includes timer circuitry, and with an external programmable controller (e.g., CPU 2), controls the timing and sequencing of power up and power down operations of the GPU and device 8 (implemented as a flat panel display). In such a conventional system, the timer circuitry would respond to external control signals (e.g., a "power on" signal from CPU 2 of FIG. 1) by asserting power up or power down signals for the flat panel display and for internal circuitry in the GPU with selectable delay times determined by the external controller. For example, an external control signal could trigger execution of the following operations in a predetermined sequence: turning the backlight of the flat panel display on or off, causing the flat panel display to start or cease generating a display in response to video data in frame buffer 6, and commencing or ceasing application of power to the flat panel display and internal components of the GPU. However, because the external controller employed (with timer circuitry as described) with a conventional GPU is conventionally a general-purpose processor, the external controller is subject to interrupts and thus cannot provide guaranteed timing.

SUMMARY OF THE INVENTION

In the specification, including in the claims, the term "device" (without qualifying terminology) will denote either a display device (e.g., a flat panel display device) or a graphics processor. In a class of embodiments, the invention is a device including a microcontroller that functions as a sequencer. In other embodiments, the invention is a computer system including such a device.

In preferred embodiments, the microcontroller functions as a sequencer for controlling the timing of power up and/or power down operations by one or both of a graphics processor and a display device. For example, the microcontroller is implemented in a graphics processor and controls the timing which the graphics processor and a display device coupled thereto perform the steps required to enter or leave a "suspend" mode (or other reduced power consumption mode), or perform the sequence of steps comprising a full power up (or power down) operation. The microcontroller is purposely implemented to exclude any capacity to handle interrupts and so can provide guaranteed timing (unlike a general-purpose CPU subject to interrupts).

The microcontroller is preferably implemented to be small, simple, and programmable. Preferably, it can be programmed to execute any of a small number of programs (e.g., a "full power down" program, a "full power up" program, a "suspend mode entry" program, and a "suspend mode exit" program). In typical embodiments, when executing a program it overrides (in an ordered sequence) state and control bits normally asserted by the device in which it is embodied (e.g., those determined by register bits of the device).

Another aspect of the invention is a microcontroller of the type included in any of the embodiments of the inventive display device or graphics processor. The microcontroller is configured to execute a small set of instructions, such as a set consisting of or including the following instructions: "wait" (wait for a specified amount of time), "set" (override or overwrite a specified register bit with a "one"), "clear" (override or overwrite a specified register bit with a "zero"), "release" (cease overriding a specified register bit, or overwrite a previously overwritten specified register bit to its original value), and "stop" (enter a state in which the microcontroller is free to begin executing another program). Preferably, the microcontroller includes a program memory (e.g., a RAM) into which a small number of programs (e.g., four programs) can be loaded from a host, a program counter, and instruction execution circuitry for executing the instructions of each program. The microcontroller optionally includes a timer for generating control signals with timing determined by instructions in the program memory.

In preferred embodiments, the program memory is a RAM having X bit width and Z bit depth, in which a maximum number, N, of programs can be stored. X is the number of bits of each instruction of each program, and Z is the maximum number of steps of all the programs that can be stored. Typically, X=8, N=4 and Z=64, so that one program (consisting of up to 64 instructions), four programs (each consisting of up to 16 instructions), or two or three programs can be stored in the program memory. Each of the X-bit words stored in the RAM determines one instruction for one of the stored programs.

In other preferred embodiments, the program memory is a RAM having S*M=X bit width and Z bit depth, in which a maximum number, N, of programs can be stored, and where M is the number of bits of each instruction of each program and S is the maximum number of instructions that can be stored in each row of the program memory. Typically, S=4, M=8, N=4, and Z=16. Each of the X-bit words stored in the RAM determines one M-bit instruction for each of the stored programs. A multiplexer selectively passes through to the instruction execution circuitry one of the instructions determined by each X-bit word read from a row of the RAM.

In response to the instructions of each program, the instruction execution circuitry outputs a two-bit control value for each of Y register bits: one bit of the control word indicating whether the register bit is to be overridden; the other indicating the "override" value of each register bit to be overridden. Each register bit is a state or control bit, and Y is typically equal to 32.

Preferably, the microcontroller includes two program counters and can execute two programs simultaneously (in interleaved fashion), including by selectively passing the output of each program counter to the program memory.

DETAILED DESCRIPTION OF THE PREFERRED EMBODIMENTS

Figure 1:
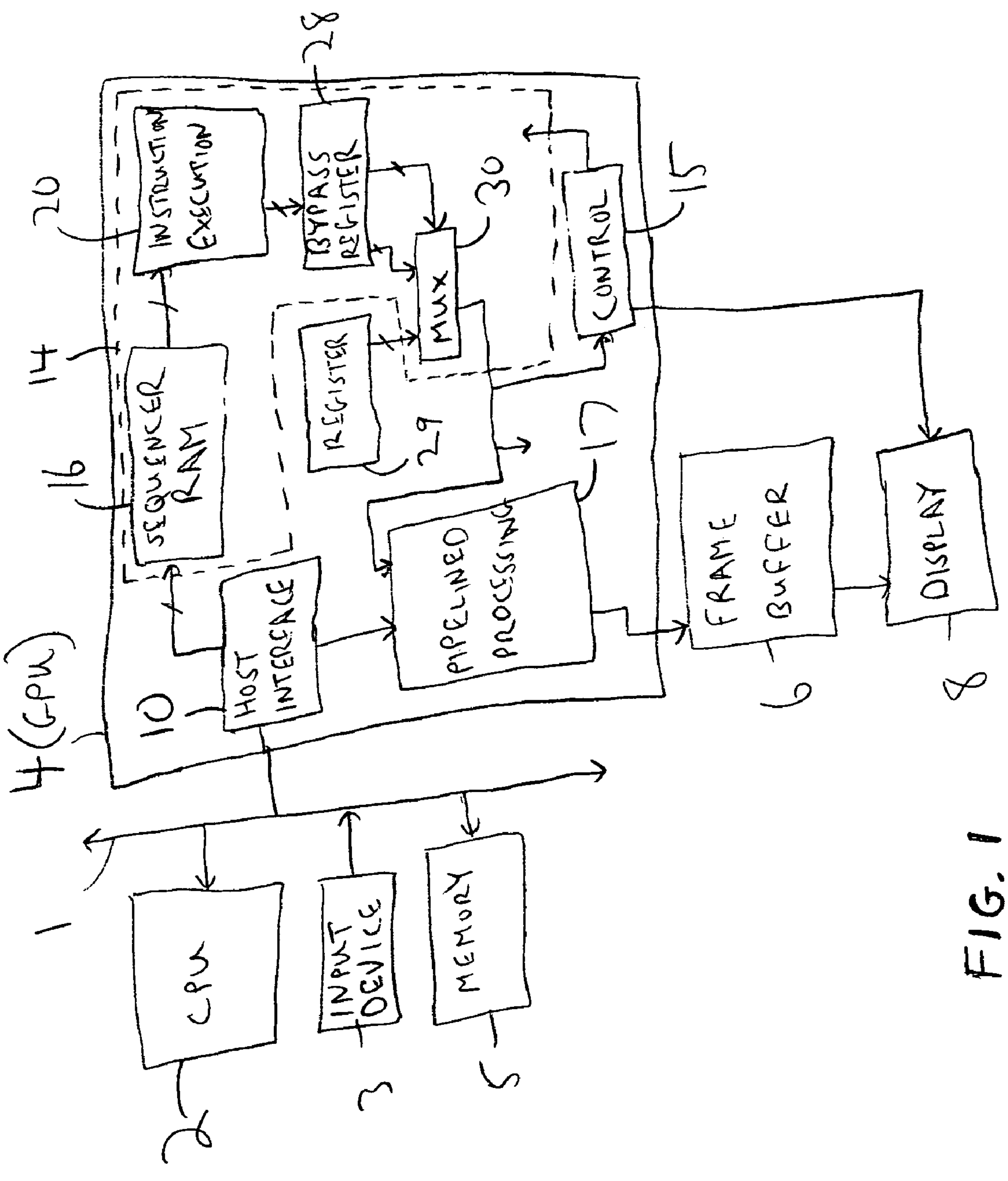
FIG. 1 is a block diagram of a system that embodies the invention.
Figure 2:
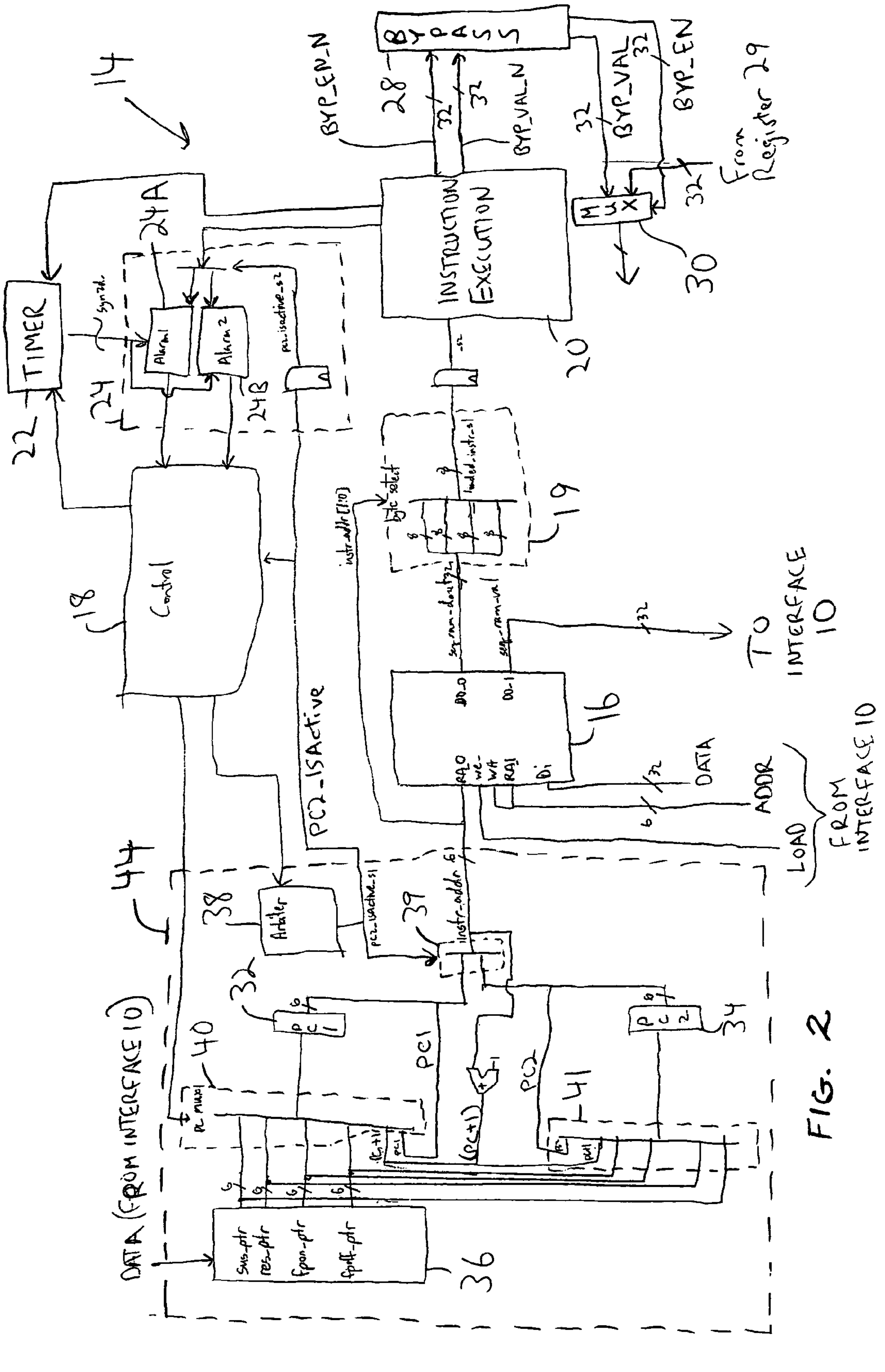
FIG. 2 is a block diagram of a preferred embodiment of microcontroller 14 of graphics processor 4 of FIG. 1.

We will describe a preferred embodiment of the inventive graphics processor with reference to FIGS. 1 and 2. This embodiment is GPU 4 of FIG. 1 with microcontroller 14 implemented as shown in FIG. 2.

GPU 4 of FIG. 1 includes set of registers 29 (sometimes referred to herein as register 29), into which bits are loaded (e.g., by control circuitry 15) for use in normal operating modes of GPU 4 by other elements of GPU 4 (including control circuitry 15). In such normal operating modes, multiplexer 30 passes through the register bits in register 29 to the other elements of GPU 4 in which they are needed. Each register bit is a state or control bit. For example, GPU 4 can use one bit from register 29 to determine whether power is supplied to a backlight of display device 8 (where display device 8 is a flat panel display).

During execution of at least one program preloaded in program memory 16 of microcontroller 14, instruction execution circuitry 20 asserts control bits (e.g., a thirty-two bit word identified as "BYP_EN_N" in FIG. 2 and a thirty-two bit word identified as "BYP_VAL_N" in FIG. 2) to bypass register 28 (e.g., by decoding instructions from program memory 16 and executing the decoded instructions).

During program execution, while control bit sets (each set comprising two 32-bit words, in preferred embodiments) are clocked out of register 28 to multiplexer 30, a first subset of each such control bit set (thirty-two bits identified as "bypass enable" or "BYP_EN" bits in FIG. 2) causes multiplexer 30 to pass through selected ones of a second subset of the control bit set (all or some of the thirty-two bits identified as "bypass" or "BYP_VAL" values in FIG. 2) in place of corresponding register bits in register 29. As a result, display device 8 and internal circuitry in GPU 4 (including control circuitry 15) operate in response to each bypass value passed through multiplexer 30 from register 28.

Microcontroller 14 of FIG. 2 includes program memory 16 (implemented as a sequencer RAM) that can be programmed by a host (e.g., by CPU 2 via host interface 10) to execute any of a small number of programs. In preferred embodiments, these programs allow microcontroller 14 to function as a sequencer for controlling the timing of power up and/or power down operations by both GPU 4 and display device 8. For example, in one embodiment program memory 16 is programmed to execute four programs: a "full power down" (or "flat panel power down") program for turning off display device 8 and placing GPU 4 in a reduced power mode in which it consumes reduced power (or no power), a "full power up" program for turning on display device 8 and causing GPU 4 to undergo a transition from a reduced power mode to a normal operating mode, a "suspend mode entry" program for causing GPU 4 to enter a "suspend" mode in which it consumes reduced power, and a "suspend mode exit" program for causing GPU 4 to undergo a transition from a suspend mode to a normal operating mode.

Microcontroller 14 of FIG. 2 is implemented to exclude any capacity to handle interrupts, and thus so can execute the programs preloaded into it with guaranteed timing (unlike a general-purpose CPU that is subject to interrupts).

Microcontroller 14 of FIG. 2 is configured to execute a small set of instructions, such as a set consisting of or including the following instructions:

"wait" (wait for a specified amount of time), "set" (override a specified register bit in register 29 with a "one"), "clear" (override a specified register bit in register 29 with a "zero"), "release" (cease overriding a specified register bit in register 29), and "stop" (enter a state in which microcontroller 14 is free to begin executing another program). Microcontroller 14 includes program memory 16 (a RAM, into which one, two, three, or four programs can be loaded from a host), program counter circuitry 44, instruction execution circuitry 20 for executing the instructions of each program, and timer 22 and alarm circuitry 24 for generating control signals with timing determined by instructions in the program memory.

In a class of preferred embodiments, the invention includes a program memory implemented as a RAM (random access memory) having S*M=X bit width and Z bit depth, in which a maximum number, N, of programs can be stored, and where M is the number of bits of each instruction of each program and S is the maximum number of instructions that can be stored in each row of the program memory. For example, program memory 16 of FIG. 2 is preferably such a RAM in which S=4, M=8, N=4, and Z=16. Each of the X-bit words stored in such an implementation of program memory 16 determines one 8-bit instruction for each of the stored programs.

Multiplexer 19 of FIG. 2 selectively passes through to instruction execution circuitry 20 one of the instructions of each word read from program memory 16. When program memory 16 is a RAM of the type described in the previous paragraph in which S=4, M=8, N=4, and Z=16, multiplexer 16 selectively passes through to instruction execution circuitry 20 one of the instructions determined by each 32-bit word read from a row of program memory 16.

In another class of preferred embodiments, the invention includes a program memory implemented as a RAM having X bit width and Z bit depth, in which a maximum number, N, of programs can be stored. Each of the X-bit words stored in the RAM determines one instruction for one of the stored programs, and Z is the maximum number of steps of all the programs that can be stored. For example, in a variation on the FIG. 2 embodiment, multiplexer 19 is omitted and program memory 16 is replaced by such a RAM in which X=8, N=4 and Z=64, so that one program (consisting of up to 64 instructions), four programs (each consisting of up to 16 instructions), or two or three programs can be stored in the program memory.

With reference again to FIG. 2, program counter circuitry 44 includes two program counters, and microcontroller 14 of FIG. 2 is operable in a mode in which circuitry 44 selectively passes to program memory 16 the output of each program counter (a sequence of pointers to instructions in program memory 16), and the microcontroller executes two programs stored in memory 16 simultaneously (in interleaved fashion). In response to the instructions of each program, instruction execution circuitry 20 outputs a two-bit control value for each of Y register bits: one bit (a bit of the word "BYP_EN_N") indicating whether the register bit is to be overridden; the other bit (a bit of the word "BYP_VAL_N") indicating the "override" value of each register bit to be overridden. Typically, Y=32.

In a class of preferred embodiments, the invention includes a program memory implemented as a RAM (random access memory) having X bit width and Z bit depth, in which a maximum number, N, of programs can be stored. Each of the X-bit words stored in the RAM determines one instruction for one of the stored programs, and Z is the maximum number of steps of all the programs that can be stored. For example, in a variation on the embodiment shown in FIG. 2, multiplexer 19 is omitted and program memory 16 is replaced by such a RAM in which X=8, N=4 and Z=64, so that one program (consisting of up to 64 instructions), four programs (each consisting of up to 16 instructions), or two or three programs can be stored in program memory 16.

Microcontroller 14 of FIG. 2 also includes control unit 18. Elements 18, 22, 24, 16, 19, 20, 28, 39, and 44 are connected as shown. Microcontroller 14 operates in fully pipelined fashion in response to a clock, and relies on timer 22 to execute the above-mentioned "wait" instructions.

Program counter circuitry 44 includes instruction pointer register 36, multiplexers 40 and 41 (each having six inputs, four of which are coupled to register 36), registers 32 and 34 (coupled respectively to the outputs of multiplexers 40 and 41), multiplexer 39 (coupled to assert the pointer in either register 32 or 34 to memory 16's read address input), and arbiter 38. Arbiter 38 is coupled to multiplexer 39 and operates to control which of the inputs to multiplexer 39 is passed through to memory 16.

Register 36 stores a pointer to the first instruction of each of one, two, three, or four programs stored in program memory 16 (i.e., an instruction address for reading each such first instruction from memory 16). For example, register 36 can store the following four pointers (as shown in FIG. 2): sus_ptr (pointing to the first instruction of the above-mentioned "suspend mode entry" program), res_ptr (pointing to the first instruction of the above-mentioned "suspend mode exit" program), fpon_ptr (pointing to the first instruction of the above-mentioned "full power up" program), and fpoff_ptr (pointing to the first instruction of the above-mentioned "full power down" program. The pointers can be written into register 36 by a host (e.g., by CPU 2 via host interface 10), and are 6-bit words in a preferred implementation of FIG. 2.

In response to control signals from control unit 18, arbiter 38 asserts a thread selection signal ("PC2_is Active") to multiplexer 39, control unit 18, and alarm circuitry 24. The thread selection signal controls which of the inputs to multiplexer 39 is passed through (to program memory 16) as a read address.

Execution of a program can be started by a register bit stored in the graphics processor (e.g., in register 29). Execution of a program can be started in response to a command to execute a program stored in program memory 16 (e.g., a command from control unit 15 of FIG. 1 to control unit 18, or a command from control unit 15 that sets a register bit in register 29 that in turn triggers execution of the program). Once execution of a program begins, the sequence of program instructions is executed without receipt of any external data by the microcontroller.

In response to a command or register bit that triggers execution of a program stored in program memory 16, control unit 18 causes multiplexer 40 to assert to register 32 (from register 36) the pointer to the program's initial instruction. The pointer in register 32 (the six-bit pointer labeled "PC1" in FIG. 2) is asserted to a first input of multiplexer 39 and to a fifth input of multiplexer 40, typically during the clock cycle after it is loaded into register 32. During each clock cycle in which multiplexer 39 passes through the pointer PC1 to memory 16, the value of PC1 is incremented by one, and the resulting "next" pointer (labeled "PC+1" in FIG. 2) is asserted to a sixth input of multiplexer 40. After (or during the same clock cycle in which) the pointer to the program's initial instruction is asserted from register 32 through multiplexer 39 to memory 16, control unit 18 typically causes multiplexer 40 to assert to register 32 the next pointer ("PC+1") at the sixth input of multiplexer 40 (assuming that the initial instruction is not a "Wait" instruction). These steps are typically repeated until the end of the program or until unit 20 executes a "Wait" instruction. When unit 20 is not executing a "Wait" instruction, whenever multiplexer 39 asserts a pointer ("PC 1") from register 32 to memory 16, control unit 18 causes multiplexer 40 to load into register 32 the next pointer "PC+1" (the sixth input of multiplexer 40). As a result, microcontroller 14 enters a mode in which it reads a sequence of program instructions from memory 16 and asserts them to unit 20, unit 20 executes the instructions to cause bypass enable bits and bypass values to be clocked out of register 28 to multiplexer 30, and multiplexer 30 passes through at least some of the bypass values to override register bits from register 29 that are passed through multiplexer 30 at times other than during execution of the program.

When only one program is being executed, the thread selection signal ("PC2_is Active") causes only alarm unit 24A of alarm circuitry 24 to be coupled to unit 20. During execution of a "Wait" instruction, unit 20 asserts a "wait interval start" signal to alarm unit 24A and timer 22, and sends control bits to timer 22 that are indicative of the duration of the wait interval. In response, alarm unit 24A asserts a "suspend" signal to control unit 18. In response, unit 18 causes multiplexer 40 to pass the pointer at its fifth input (the current pointer "PC1") to register 32 (rather than the pointer at its sixth input). Thus, no new instruction is asserted from memory 16 to unit 20 during the wait interval specified by the current "Wait" instruction. At the end of the wait interval, timer 22 asserts a "wait interval end" signal to unit 24A, causing unit 24A to cease assertion of the suspend signal to unit 18, which in turn causes unit 18 to cause multiplexer 40 again to pass the pointer at its sixth input (the next pointer "PC+1") to register 32. As a result, microcontroller 14 again enters a mode in which it asserts a sequence of different instructions of the program from memory 16 to unit 20.

Preferably, timer 22 is preprogrammed to assert each "wait interval end" signals with appropriate timing in response to specific control bits from instruction execution unit 20.

In response to one or more commands or register bits that trigger execution of two programs stored in program memory 16, control unit 18 causes multiplexer 40 to assert to register 32 (from register 36) the pointer to the initial instruction of one program and multiplexer 41 to assert to register 34 (from register 36) the pointer to the second program's initial instruction. The pointer in register 32 (the six-bit pointer labeled "PC1" in FIG. 2) is asserted to an input of multiplexer 39, and the pointer in register 34 (the six-bit pointer labeled "PC2") is asserted to another input of multiplexer 39. During each clock cycle in which multiplexer 39 passes PC1 to memory 16, the pointer PC1 is incremented by one, and the resulting "next" pointer (labeled "PC+1" in FIG. 2) is asserted to a sixth input of multiplexer 40. During each clock cycle in which multiplexer 39 passes PC2 to memory 16, the pointer PC2 is incremented by one, and the resulting "next" pointer (labeled "PC+1" in FIG. 2) is asserted to a sixth input of multiplexer 41. After (or during the same clock cycle in which) the pointer to the program's initial instruction is asserted from register 32 through multiplexer 39 to memory 16, control unit 18 typically causes multiplexer 40 to pass through the pointer at its sixth input (the next pointer "PC+1" of the first program) to register 32 (assuming that the first program's initial instruction is not a "Wait" instruction) and control unit 18 typically causes multiplexer 41 to pass through the pointer at its sixth input (the next pointer "PC+1" of the second program) to register 34 (assuming that the second program's initial instruction is not a "Wait" instruction). When unit 20 is not executing a "Wait" instruction, arbiter 38 toggles the thread selection signal ("PC2_is Active") between its two binary values once per clock cycle, thus causing both programs to run in interleaved fashion. As a result, microcontroller 14 enters a mode in which it reads a sequence of instructions of the first program interleaved with a sequence of instructions of the second program from memory 16 and asserts both sequences of instructions in interleaved fashion to unit 20. Unit 20 executes the instructions to cause bypass enable bits and bypass values to be clocked out of register 28 to multiplexer 30, and multiplexer 30 passes through at least some of the bypass values to override register bits from register 29 that are passed through multiplexer 30 at times other than during execution of the programs. From the user's perspective, microcontroller 14 executes each of the two programs at half the speed at which it can execute one of the programs alone. This speed will be acceptable in typical applications.

When two programs are being executed, the toggling thread selection signal ("PC2_is Active") causes alarm units 24A and 24B of alarm circuitry 24 to be coupled alternatingly to unit 20. During execution of a "Wait" instruction of the first program, unit 20 asserts a "wait interval start" signal to alarm unit 24A and timer 22, and sends control bits to timer 22 that are indicative of the duration of the wait interval. In response, alarm unit 24A asserts a "suspend" signal to control unit 18. In response, unit 18 causes multiplexer 40 to pass through the pointer at its fifth input (the current pointer "PC1") to register 32 (rather than the pointer at its sixth input). Thus, no new instruction of the first program is asserted from memory 16 to unit 20 during the wait interval specified by the current "Wait" instruction, but a sequence of different instructions of the second program can be asserted from memory 16 to unit 20. At the end of the wait interval, timer 22 asserts a "wait interval end" signal to unit 24A, causing unit 24A to cease assertion of the suspend signal to unit 18, which in turn causes unit 18 to cause multiplexer 40 again to pass through the pointer at its sixth input (the next pointer "PC+1") to register 32. As a result, microcontroller 14 again enters a mode in which it can execute sequences of different instructions of both programs in interleaved fashion.

During execution of a "Wait" instruction of the second program, unit 20 asserts a "wait interval start" signal to alarm unit 24B and timer 22, and sends control bits to timer 22 that are indicative of the duration of the wait interval. In response, alarm unit 24B asserts a "suspend" signal to control unit 18. In response, unit 18 causes multiplexer 41 to pass through the pointer at its fifth input (the current pointer "PC1") to register 34 (rather than the pointer at its sixth input). Thus, no new instruction of the second program is asserted from memory 16 to unit 20 during the wait interval specified by the current "Wait" instruction, but a sequence of instructions of the first program are asserted from memory 16 to unit 20. At the end of the wait interval, timer 22 asserts a "wait interval end" signal to unit 24B, causing unit 24B to cease assertion of the suspend signal to unit 18, which in turn causes unit 18 to cause multiplexer 41 again to pass through the pointer at its sixth input (the next pointer "PC+1") to register 34. As a result, microcontroller 14 again enters a mode in which it can execute sequences of different instructions of both programs in interleaved fashion.

In alternative embodiments, the bypass values produced by the inventive microcontroller are employed to overwrite register bits (e.g., bits in register 29 of a modified version of GPU 4) rather than to override such register bits (e.g., by being selected in favor of the register bits by multiplexing circuitry as in the FIG. 1 embodiment). For example, in a modified version of GPU 4 in which multiplexer 30 is omitted, a sequence of control bit sets (each set comprising two 32-bit words, for example) is clocked out of register 28 to register 29, and a first subset of each control bit set (e.g., a 32-bit word of bypass enable bits) causes a second subset of each control bit set (some or all bits of a 32-bit word of bypass values) to be written to register 29 to overwrite corresponding register bits in register 29. The microcontroller could be configured to execute a small set of instructions, such as a set consisting of or including the following instructions: "wait" (wait for a specified amount of time), "set" (overwrite a specified register bit in register 29 with a "one"), "clear" (overwrite a specified register bit in register 29 with a "zero"), "release" (overwrite a previously overwritten specified register bit to its original value), and "stop" (enter a state in which the microcontroller is free to begin executing another program).

An example of a program that can be loaded in program memory 16 is the following sequence of six instructions:

| | | |
|---|---|---|
| SET | IDDQ_BIT | (override a specified register bit stored in register 29 with one) |
| WAIT | 3, 10 | (wait for 3 * $2^{10}$ microseconds, which is about 3 ms) |
| CLEAR | IDDQ_BIT | (override the specified register bit in register 29 with a zero) |
| WAIT | 0, 0 | (wait for one clock cycle) |
| RELEASE | IDDQ_BIT | (do not override the specified register bit in register 19 anymore) |
| STOP | | |

The following eight-bit instructions could be stored in program memory 16 at the indicated addresses for executing this program:

| Address: | Instruction | (Description of instruction) |
|---|---|---|
| 0x00: | 0xA1 | (SET 1) |
| 0x01: | 0x2B | (WAIT 3, 10) |
| 0x02: | 0xC1 | (CLEAR 1) |
| 0x03: | 0x00 | (WAIT 0, 0) |
| 0x04: | 0x81 | (RELEASE 1) |
| 0x05: | 0x7F | (STOP) |

where the prefix "0x" denotes that the following symbol is a hexadecimal representation of a number (for example "0xC1" denotes a binary number 11000001).

In a preferred implementation, the instructions stored in the program memory have the following formats:

each 8-bit "Wait" instruction has format 00xxxxxx (where the six least significant bits are a floating point number comprising a four-bit mantissa and a two-bit exponent). For example, the exponent can be a two-bit value E indicative of "$2^{2E}$";

each 8-bit "Release" instruction has format 100xxxxx (where the five least significant bits indicate the register bit to release);

each 8-bit "Set" instruction has format 101xxxxx (where the five least significant bits indicate the register bit to set);

each 8-bit "Clear" instruction has format 110xxxxx (where the five least significant bits indicate the register bit to clear); and the "Stop" instruction is 01111111.

In an implementation of graphics processor 4 with microcontroller 14 implemented as shown in FIG. 2, the following is an example of source code for a program (i.e., the above-mentioned "full power up" program) for powering up a flat panel display device coupled to the graphics processor (in the following listing, the symbol "//" precedes each comment):

// The wait interval indicated by a wait instruction denoted as "WAIT M,E" is $M*2^{(2E)}$ microseconds, where 3 M 0; 15 E 0.

// the release instruction "RELEASE [0–31]" denotes that the register bit identified by the value in brackets is to be released.

// the set instruction "SET [0–31]" denotes that the register bit identified by the value in brackets is to be set.

// the clear instruction "CLEAR [0–31]" denotes that the register bit identified by the value in brackets is to be cleared.

// NOP, which is the same as "WAIT 0, 0," is a "no operation" instruction.

// All programs must end with the STOP command.

| | | |
|---|---|---|
| CLEAR | [PD_TMDSPLL_H1] | // powerup tmds p11 h1 |
| CLEAR | [PD_TMDSPLL_H2] | // powerup tmds p11 h2 |
| WAIT | 2, 3 | // wait ~ 128 microseconds |
| SET | [GPIO3_OUT] | // enable panel power |
| WAIT | 1, 1 | // wait ~ 4 microseconds |
| SET | [AUX3_TMDS1_L0] | // enable i/o's |
| SET | [AUX3_TMDS1_L1] | // enable i/o's |
| CLEAR | [FPBLANK_H1] | // disable blanking color |
| WAIT | 3, 0 | // wait ~ 3 microseconds |
| CLEAR | [FPBLANK_H2] | // disable blanking color |
| SET | [GPIO2_OUT] | // enable backlight |
| STOP | | |

In variations on the FIG. 1 embodiment, the inventive microcontroller is implemented in a display device (e.g., device 8 of FIG. 1) rather than in a graphics processor coupled to a display device, or in addition to being implemented in such a graphics processor. Preferably, the microcontroller in the display device is programmed to control the timing with which the display device (and optionally also a graphics processor coupled thereto) performs the steps required to enter or leave a "suspend" mode (or other reduced power consumption mode) and/or performs the sequence of steps comprising a full power up (or power down) operation.

In some embodiments, the inventive microcontroller does not employ a timer (e.g., timer 22 of FIG. 2) to control the timing of execution of instructions. For example, in some embodiments all required timing is performed completely in software without the use of timer hardware.

In preferred embodiments, the inventive microcontroller (e.g., microcontroller 14 of FIG. 2) is implemented to be small, simple, and programmable. Preferably, it can be programmed to execute any of a small number of programs (e.g., a "full power down" program, a "full power up" program, a "suspend mode entry" program, and a "suspend mode exit" program). The programs typically implement power up or power down operations, but can implement other operations (e.g., other operations that should be performed with guaranteed timing without being subject to interrupts).

It should be understood that while certain forms of the invention have been illustrated and described herein, the invention is not to be limited to the specific embodiments described and shown.

What is claimed is:

1. A device, comprising:

a set of registers storing register bits, wherein each of the register bits is a state or control bit; and a microcontroller coupled to the registers and configured to selectively override the registers, wherein the microcontroller is configured to function as a sequencer for controlling the timing of at least one operation of the device by executing instructions in a manner immune from interrupts, to assert a sequence of control bits that override selected one or more of the register bits.

2. The device of claim 1, wherein said device is a graphics processor.

3. The device of claim 2, wherein the operation is at least one of a display power up operation, a display power down operation, a suspend mode entry operation, and a suspend mode exit operation.

4. The device of claim 1, wherein said device is a display device.

5. The device of claim 4, wherein the operation is at least one of a display power up operation, a display power down operation, a suspend mode entry operation, and a suspend mode exit operation.

6. The device of claim 1 wherein the operation is the supply of power to the display device.

7. The device of claim 1 including control circuitry coupled and configured to assert a predetermined sequence of instructions with timing determined by the instructions of the sequence.

8. The device of claim 1 wherein the instructions to provide timing immune from interrupts include wait, release and stop.

9. The device of claim 1 wherein the microcontroller, by executing instructions in a manner immune from interrupts provides guaranteed timing of the operation.

10. A device, comprising:

a set of registers storing register bits, wherein each of the register bits is a state or control bit; and a microcontroller coupled to the registers and configured to selectively overwrite the register bits, wherein the microcontroller is configured to function as a sequencer for controlling the timing of at least one operation of the device by executing instructions in a manner immune from interrupts, to assert a sequence of control bits that overwrite selected enes one or more of the register bits.

11. The device of claim 10, wherein said device is a graphics processor.

12. The device of claim 11, wherein the operation is at least one of a display power up operation, a display power down operation, a suspend mode entry operation, and a suspend mode exit operation.

13. The device of claim 10, wherein said device is a display device.

14. The device of claim 13, wherein the operation is at least one of a display power up operation, a display power down operation, a suspend mode entry operation, and a suspend mode exit operation.

15. The device of claim 10 wherein the operation is the supply of power to the display device.

16. The device of claim 10 including control circuitry coupled and configured to assert a predetermined sequence of instructions with timing determined by the instructions of the sequence.

17. The device of claim 10 wherein the instructions to provide timing immune from interrupts include wait, release and stop.

18. The device of claim 10 wherein the microcontroller, by executing instructions in a manner immune from interrupts provides guaranteed timing of the operation.

19. A microcontroller configured to be coupled to registers of a device for selectively overriding register bits stored in the registers, wherein each of the register bits is a state or control bit, and the microcontroller is configured to function as a sequencer for controlling the timing of at least one operation of the device by executing instructions in a manner immune from interrupts to assert a sequence of control bits that override selected one or more of the register bits, said microcontroller comprising:

a random access memory storing the instructions, wherein each of the instructions is one of a wait instruction, a set instruction, a clear instruction, a release instruction, and stop instruction; and control circuitry coupled and configured to cause the memory to assert a predetermined sequence of the instructions with timing determined by the instructions of said sequence.

20. The microcontroller of claim 19, also including:

instruction execution circuitry coupled to receive the predetermined sequence of the instructions from the memory and configured to execute said instructions to generate the sequence of control bits.

21. The microcontroller of claim 19, wherein the sequence of control bits includes control bits for overriding register bits of a graphics processor, and the operation is at least one of a display power up operation of the graphics processor, a display power down operation of the graphics processor, a suspend mode entry operation of the graphics processor, and a suspend mode exit operation of the graphics processor.

22. The microcontroller of claim 19, wherein the control circuitry includes:

program counter circuitry coupled and configured to cause the memory to assert a first predetermined sequence of the instructions with timing determined by the instructions of said first predetermined sequence, and to cause the memory to assert a second predetermined sequence of the instructions with timing determined by the instructions of the second predetermined sequence, wherein at least some of the instructions of the second predetermined sequence are interleaved with instructions of the first predetermined sequence.

23. The microcontroller of claim 19, wherein the operation is at least one of a display power up operation, a display power down operation, a suspend mode entry operation, and a suspend mode exit operation.

24. A microcontroller configured to be coupled to registers of a device for selectively overwriting register bits stored in the registers, wherein each of the register bits is a state or control bit, and the microcontroller is configured to function as a sequencer for controlling the timing of at least one operation of the device by executing instructions in a manner immune from interrupts to assert a sequence of control bits that overwrite selected one or more of the register bits, said microcontroller comprising:

a random access memory storing the instructions, wherein each of the instructions is one of a wait instruction, a set instruction, a clear instruction, a release instruction, and stop instruction; and control circuitry coupled and configured to cause the memory to assert a predetermined sequence of the instructions with timing determined by the instructions of said sequence.

25. The microcontroller of claim 24, also including:

instruction execution circuitry coupled to receive the predetermined sequence of the instructions from the memory and configured to execute said instructions to generate the sequence of control bits.

26. The microcontroller of claim 24, wherein the sequence of control bits includes control bits for overwriting register bits of a graphics processor, and the operation is at least one of a display power up operation of the graphics processor, a display power down operation of the graphics processor, a suspend mode entry operation of the graphics processor, and a suspend mode exit operation of the graphics processor.

27. The microcontroller of claim 24, wherein the control circuitry includes:

program counter circuitry coupled and configured to cause the memory to assert a first predetermined sequence of the instructions with timing determined by the instructions of said first predetermined sequence, and to cause the memory to assert a second predetermined sequence of the instructions with timing determined by the instructions of the second predetermined sequence, wherein at least some of the instructions of the second predetermined sequence are interleaved with instructions of the first predetermined sequence.

28. A system, including:

a system bus;

a CPU connected along the system bus;

a graphics processor connected along the system bus;

a frame buffer coupled to receive video data from the graphics processor; and a display device, coupled and configured to receive frames of the video data from the frame buffer and to produce a display in response thereto, wherein at least one of the graphics processor and the display device includes:

a set of registers storing register bits, wherein each of the register bits is a state or control bit; and a microcontroller coupled to the registers and configured to function as a sequencer for controlling the timing of at least one operation of said at least one of the graphics processor and the display device by executing instructions in a manner immune from interrupts, to assert a sequence of control bits that override or overwrite selected one or more of the register bits.

29. The system of claim 28, wherein the microcontroller is configured to commence execution of a sequence of the instructions in response to at least one of the register bits, and to execute the sequence of the instructions without receipt of any external data.

30. The system of claim 28, wherein the display device is a flat panel display having a backlight, the graphics processor includes the set of registers and the microcontroller, and at least one of the register bits controls supplied power to only the backlight of the flat panel display.

31. The system of claim 30, wherein execution of the instructions determines a time interval between the supplying of power to the backlight of the flat panel display and the supplying of power to at least one other element of the flat panel display.

32. The system of claim 31, wherein the microcontroller is configured to determine the time interval by software looping without the use of a hardware timer circuit.

33. The system of claim 31, wherein the microcontroller includes a timer circuit, and the time interval is determined by the timer circuit.

34. The system of claim 28, wherein the microcontroller includes:

a random access memory storing the instructions, wherein each of the instructions is one of a wait instruction, a set instruction, a clear instruction, a release instruction, and stop instruction; and control circuitry coupled and configured to cause the memory to assert a predetermined sequence of the instructions with timing determined by the instructions of said sequence.

35. The system of claim 34, wherein the microcontroller also includes:

instruction execution circuitry coupled to receive the predetermined sequence of the instructions from the memory and configured to execute the instructions to generate said sequence of control bits.

36. The system of claim 28, wherein the microcontroller is configured to selectively override the register bits, and the microcontroller includes:

multiplexer circuitry coupled to receive the sequence of control bits and the register bits, and configured to override a sequence of the register bits by passing through one of the control bits in place of each of the register bits in said sequence of the register bits.

37. The system of claim 28, wherein the microcontroller is configured to selectively overwrite the register bits.

* * * * *